(12) United States Patent
Shimoda et al.

(10) Patent No.: US 9,892,867 B2
(45) Date of Patent: Feb. 13, 2018

(54) ELECTRICITY STORAGE MODULE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Hiroki Shimoda, Yokkaichi (JP); Masakuni Kasugai, Yokkaichi (JP); Makoto Higashikozono, Yokkaichi (JP); Hisashi Sawada, Yokkaichi (JP); Hiroomi Hiramitsu, Yokkaichi (JP); Masato Tsutsuki, Yokkaichi (JP); Kazuyuki Nakagaki, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 127 days.

(21) Appl. No.: 14/432,299

(22) PCT Filed: Sep. 11, 2013

(86) PCT No.: PCT/JP2013/074482
§ 371 (c)(1),
(2) Date: Mar. 30, 2015

(87) PCT Pub. No.: WO2014/057756
PCT Pub. Date: Apr. 17, 2014

(65) Prior Publication Data
US 2015/0243450 A1    Aug. 27, 2015

(30) Foreign Application Priority Data

Oct. 10, 2012  (JP) ................. 2012-224898

(51) Int. Cl.
*H01G 11/12* (2013.01)
*H01M 2/10* (2006.01)
(Continued)

(52) U.S. Cl.
CPC ............. *H01G 11/12* (2013.01); *H01G 9/008* (2013.01); *H01G 9/08* (2013.01); *H01G 11/76* (2013.01);
(Continued)

(58) Field of Classification Search
CPC ........ H01G 11/12; H01G 11/82; H01G 11/76; H01G 9/008; H01G 9/08; H01M 2/024;
(Continued)

(56) References Cited

U.S. PATENT DOCUMENTS

2004/0002001 A1   1/2004 Watanabe
2004/0021442 A1*  2/2004 Higashino ......... H01M 10/0413
                                                320/112
(Continued)

FOREIGN PATENT DOCUMENTS

EP    2416439 A2    2/2012
EP    2432048 A1    3/2012
(Continued)

OTHER PUBLICATIONS

Nov. 5, 2013 International Search Report issued in International Application No. PCT/JP2013/074482.
(Continued)

*Primary Examiner* — Lisa S Park
(74) *Attorney, Agent, or Firm* — Oliff PLC

(57) ABSTRACT

A electricity storage module is provided with a stack formed by stacking a plurality of electricity storage elements having
(Continued)

positive and negative lead terminals that protrude outward from end portions thereof and insulating holder members made of an insulating material for holding the electricity storage elements. A connecting portion formed by connecting different polarized lead terminals of adjacent electric cells is disposed in a position shifted from other connecting portions than that connecting portion as seen from the stacking direction of the stack, and the insulating holder members are provided with windows that correspond to the connecting portions.

8 Claims, 24 Drawing Sheets

(51) Int. Cl.
| | | |
|---|---|---|
| H01M 2/20 | (2006.01) | |
| H01M 10/48 | (2006.01) | |
| H01M 10/625 | (2014.01) | |
| H01M 10/647 | (2014.01) | |
| H01M 10/6551 | (2014.01) | |
| H01M 10/6555 | (2014.01) | |
| H01M 10/613 | (2014.01) | |
| H01G 9/008 | (2006.01) | |
| H01G 9/08 | (2006.01) | |
| H01G 11/76 | (2013.01) | |
| H01G 11/82 | (2013.01) | |
| H01M 2/02 | (2006.01) | |

(52) U.S. Cl.
CPC ............ *H01G 11/82* (2013.01); *H01M 2/024* (2013.01); *H01M 2/0217* (2013.01); *H01M 2/1077* (2013.01); *H01M 2/206* (2013.01); *H01M 10/482* (2013.01); *H01M 10/613* (2015.04); *H01M 10/625* (2015.04); *H01M 10/647* (2015.04); *H01M 10/6551* (2015.04); *H01M 10/6555* (2015.04); *H01M 2220/20* (2013.01)

(58) Field of Classification Search
CPC .. H01M 2/0217; H01M 10/482; H01M 2/206; H01M 10/6555; H01M 10/647; H01M 10/6551; H01M 10/625; H01M 10/613; H01M 2/1077
See application file for complete search history.

(56) References Cited

U.S. PATENT DOCUMENTS

| | | | | |
|---|---|---|---|---|
| 2007/0141457 | A1* | 6/2007 | Amagai | H01M 2/021 429/152 |
| 2009/0325043 | A1* | 12/2009 | Yoon | H01M 2/1072 429/90 |
| 2011/0014512 | A1 | 1/2011 | Amagai et al. | |
| 2011/0059347 | A1* | 3/2011 | Lee | B60L 11/18 429/120 |
| 2012/0156537 | A1* | 6/2012 | Meintschel | B60L 11/1874 429/99 |
| 2013/0161053 | A1* | 6/2013 | Okamoto | H01M 2/206 174/68.1 |
| 2013/0244066 | A1* | 9/2013 | Kang | H01M 10/647 429/62 |

FOREIGN PATENT DOCUMENTS

| | | |
|---|---|---|
| EP | 2479835 A2 | 7/2012 |
| JP | 2004-031136 A | 1/2004 |
| JP | 2004-031270 A | 1/2004 |
| JP | 2005-222699 A | 8/2005 |
| JP | 2006-185669 A | 7/2006 |
| JP | 2012-123980 A | 6/2012 |
| JP | 2012-523086 A | 9/2012 |
| WO | 2009/107657 A1 | 9/2009 |

OTHER PUBLICATIONS

Sep. 17, 2015 Search Report issued in European Application No. 13844796.6.

* cited by examiner

ELECTRICITY STORAGE MODULE

This is a national phase application of PCT/JP2013/074482 filed on Sep. 11, 2013. This application claims priority to Japanese Application Number JP2012-224898, which was filed in the Japanese Patent Office on Oct. 10, 2012. The entire contents of which are incorporated by reference herein.

BACKGROUND

The present disclosure relates to an electricity storage module.

Known examples of electricity storage elements that contain electricity storage devices include secondary batteries, such as lithium ion batteries and nickel hydrogen batteries. A plurality of secondary batteries, such as lithium ion batteries, are connected together to form a battery module. One such battery module is known, for example, from JP 2004-31136A

SUMMARY

The foregoing JP 2004-31136A discloses a battery module composed of a plurality of stacked electric cells with positive and negative lead terminals protruding from their ends. In such a battery module, when connecting the electric cells, the differently polarized (oppositely polarized) lead terminals of adjacent electric cells are joined with one another by welding.

To join such lead terminals, for example, by ultrasonic welding, only the lead terminals being welded are pinched for welding, so that the welding cannot be performed if the electric cells have been stacked. As this requires moving the electric cells not being welded and automation is difficult, the connecting operation has been time consuming.

The present disclosure has been completed in the light of the above-described circumstances and its object is to provide an electricity storage module with improved connectability.

The present disclosure, which was made to solve the foregoing problem, is directed to an electricity storage module comprising a stack formed by stacking a plurality of electricity storage elements having positive and negative lead terminals that protrude outward from end portions thereof and insulating holder members made of an insulating material for holding the electricity storage elements, wherein a connecting portion formed by connecting together different polarized lead terminals of adjacent ones of the electricity storage elements is disposed in a position that is shifted with respect to other connecting portions as viewed from a stacking direction of the stack, and wherein windows corresponding to the connecting portions are formed in the insulating holder members.

According to the present disclosure, the connecting portions formed by connecting the different polarized lead terminals of the adjacent electricity storage elements are disposed in positions shifted as seen from the stacking direction of the stack, and windows corresponding to the connecting portions are formed in the insulating holder members. Accordingly, once a plurality of electricity storage elements, in which the lead terminals for connection with the adjacent electricity storage elements are disposed in the windows, are stacked together and the lead terminals disposed in the windows are connected, for example, by ultrasonic welding, connecting portions that connect the lead terminals are formed to allow for electrical connection of the plurality of electricity storage elements. In the present disclosure, a connecting portion between lead terminals is held on an insulating holder member in a position shifted from other connecting portions between lead terminals as seen from the stacking direction of the stack. Accordingly, the insulation between the connecting portions is maintained. As a result, as the present disclosure allows for connection of a plurality of electricity storage elements in the form of a stack while maintaining insulation, a battery module with excellent connectability can be provided.

The present disclosure may have the structures described below.

A detection terminal that detects a condition of an electricity storage element of the electricity storage elements may be connected to a lead terminal of the lead terminals of the electricity storage elements to be subjected to detection, and a detection terminal connecting portion formed by connecting the detection terminal to the lead terminal may be provided in a location shifted in a direction of a protrusion of the lead terminals with respect to a connecting portion between the lead terminal to which that detection terminal is connected and a lead terminal of the lead terminals of an electricity storage element of the electricity storage elements adjacent to the lead terminal.

If this structure is employed, not only can the lead terminals and the detection terminals be connected in a stacked condition, but also the connection can be done simultaneously with the connection of the lead terminals, thus allowing for excellent connectability.

Wires to be connected to control equipment for detecting a condition of the electricity storage elements and performing control may be connected to detection terminals, and wire accommodation grooves for accommodating the wires may be formed in the insulating holder members. This structure allows for automatic assembly of the electricity storage module, thus improving the ease of assembly.

Heat-transfer members held by the insulating holder members that conduct heat generated in the electricity storage elements may be included. This structure can improve the heat dissipation of the electricity storage module.

Slide grooves for slidably mounting the heat-transfer members may be formed in the insulating holder members. This structure improves the working efficiency when attaching the heat-transfer members to the insulating holder members A casing for accommodating the stack may be included, and heat-transfer member holder portions for holding the heat-transfer members at intervals may be formed in the case. This structure can prevent the heat generated by the electricity storage elements from being trapped inside, resulting in improved heat dissipation.

Connecting members to be electrically connected to external equipment may be connected to the lead terminals of the electricity storage elements, and connecting member holder portions for holding the connecting members may be formed in the insulating holder members This structure allows for connection of the lead terminals and the connecting members, which are to be electrically connected to external equipment when the connecting members are held by the connecting member holder portions of the insulating holder members. Moreover, as the connecting members and the lead terminals can be connected while connecting the lead terminals, the workability is improved.

An electricity storage module with improved connectability can be provided according to the present disclosure.

DETAILED DESCRIPTION OF THE EMBODIMENTS

Embodiment 1

Embodiment 1 of the present disclosure as applied to a battery module 10 will be described hereafter with reference to FIGS. 1-24. In the ensuing description, the left side as seen in FIG. 2 is referred as the front, and the right side as seen in FIG. 2 is referred as the rear, whereas the upper side as seen in FIG. 2 is referred as upward and the lower side as seen in FIG. 2 is referred as downward.

The battery module 10 of this embodiment is used, for example, as the battery module 10 of an integrated starter generator (ISG).

Battery Module 10

Figure 1:
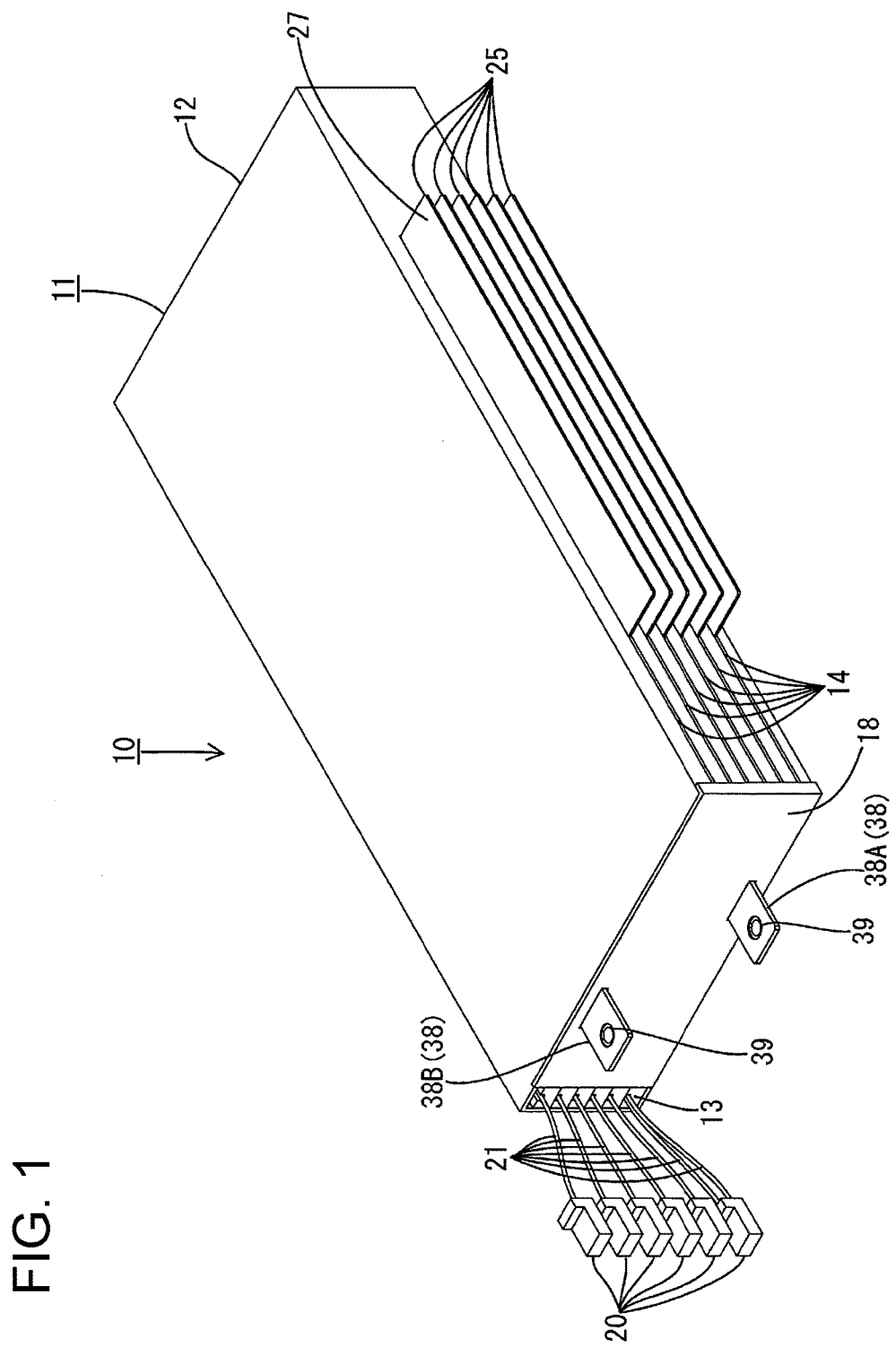
FIG. 1 is a perspective view of an electricity storage module of Embodiment 1.
Figure 2:
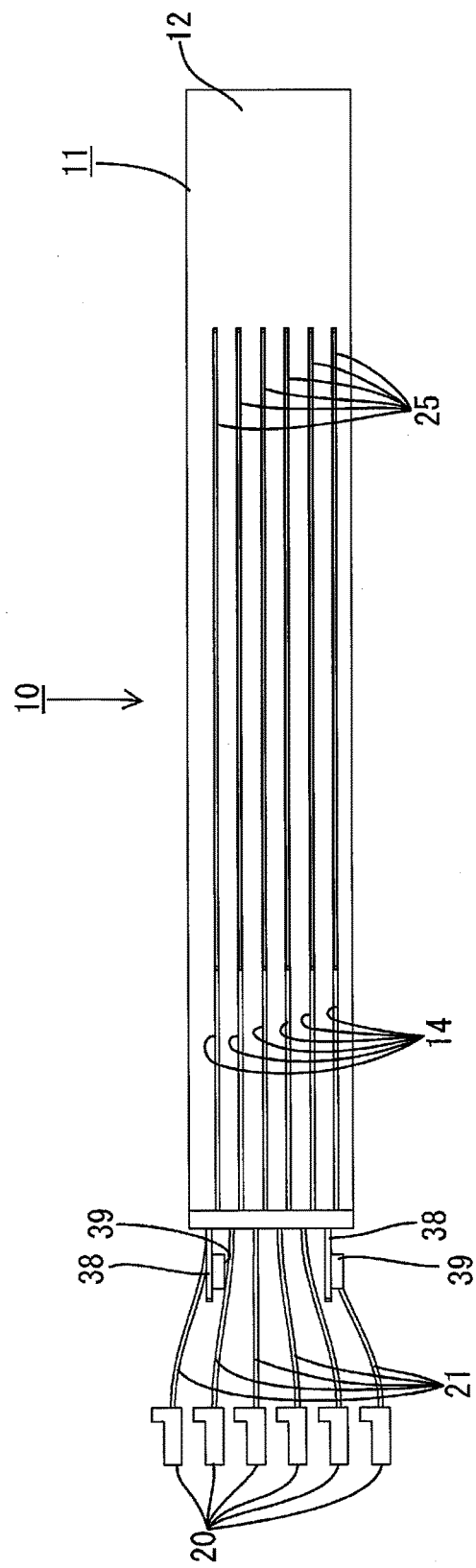
FIG. 2 is a side view of the electricity storage module.

As shown in FIG. 1, the battery module 10 generally has an approximate shape of a rectangular parallelepiped. A plurality of wires 21 connected to the lead terminals 34 of their respective electric cells 32 (an example of electricity storage elements) are drawn out of the left side, as seen in FIG. 2, (the front side) of the sides provided in the battery module 10. The plurality of wires 21 are each connected at one end to a lead terminal 34 of the respective electric cell 32 via a plate-shaped voltage detection terminal 22 (an example of a detection terminal) and at the other end to a voltage detection output connector 20 (also referred to simply as a "connector 20" hereinafter). The connectors 20 are connected to unillustrated control equipment (for example, an ECU).

Figure 3:
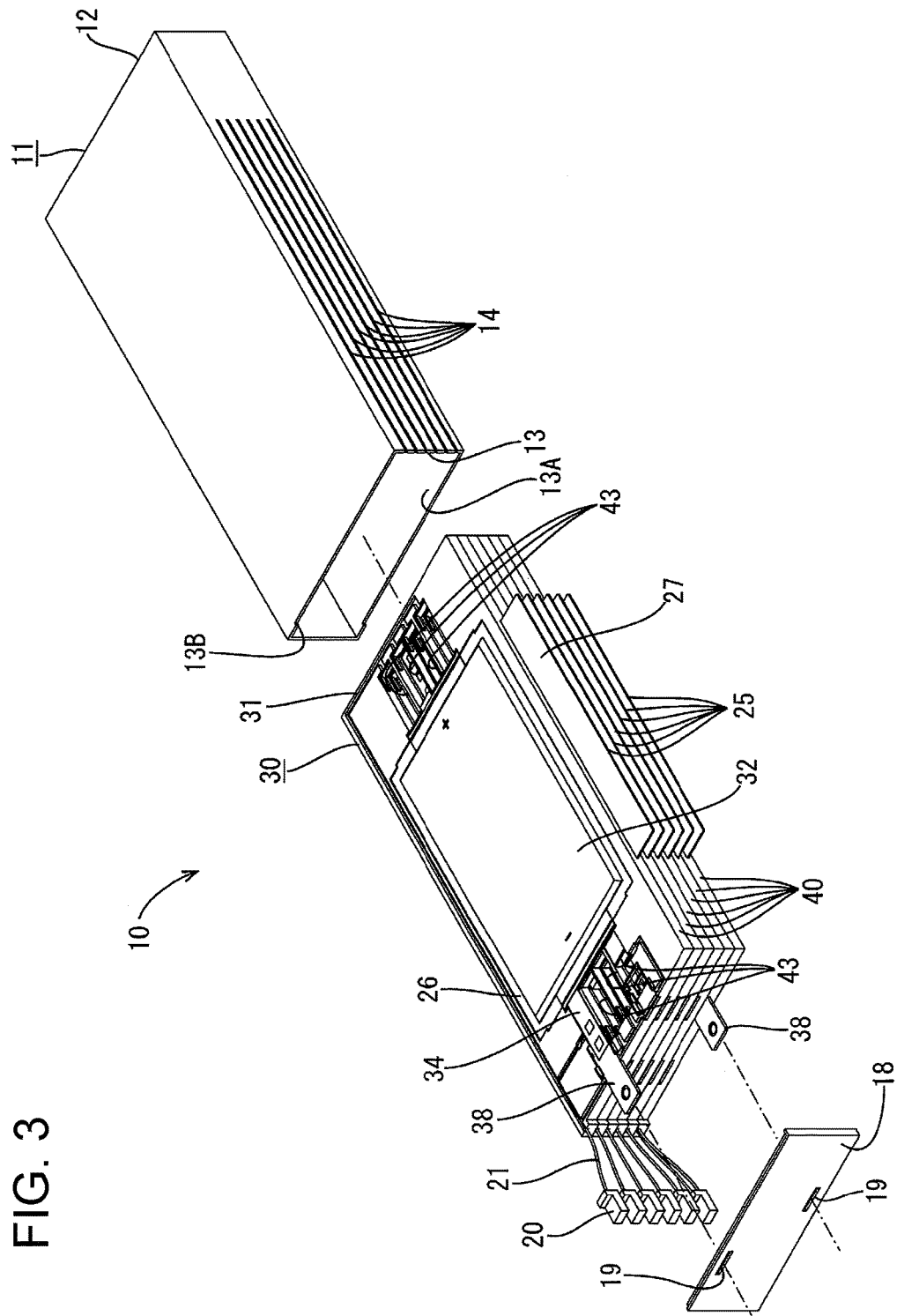
FIG. 3 is an exploded perspective view of the electricity storage module.

As shown in FIG. 3, the battery module 10 includes a stack 30 formed by stacking a plurality of electric cells 32 (six electric cells 32 in this embodiment) and a metal case 11 that accommodates the stack 30.

Case 11

The case 11 includes a main case body 12 that accommodates the stack 30 and a lid portion 18 made of an insulating resin mounted on the opening 13 at the front side of the main case body 12.

Of the sides provided in the main case body 12, the side shown in FIG. 2 is provided with six slits 14 that hold six heat-transfer members 25 at intervals (an example of heat-transfer member holder portions). The six slits 14 extend rearward from the opening 13 of the case 11 and the rear ends of the heat-transfer members 25 are disposed at the rear ends of the slits 14. The spacing between the slits 14 is approximately the same as the thickness dimension of the battery units 31.

The lid portion 18 covers the opening 13 of the main case body 12 except for the left end portion shown in FIG. 1 (the connector arrangement area 13B) where the connectors 20 are arranged. At the front end of the main case body 12, the lid portion placement area 13A, where the lid portion 18 is placed, is recessed with respect to the connector arrangement area 13B by the thickness of the lid portion 18.

The lid portion 18 is provided with busbar draw-out ports 19 out of which busbars 38 (an example of connecting members) are drawn.

Stack 30

The stack 30, which is formed by stacking a plurality of electric cells 32, is accommodated in the case 11. In this embodiment, the stack 30 is formed by stacking a plurality of electric cells 32 that are held by insulating holder members 40 with heat-transfer members 25 attached thereto (hereinafter referred to as "battery units 31") (see FIGS. 3-5).

Figure 6:
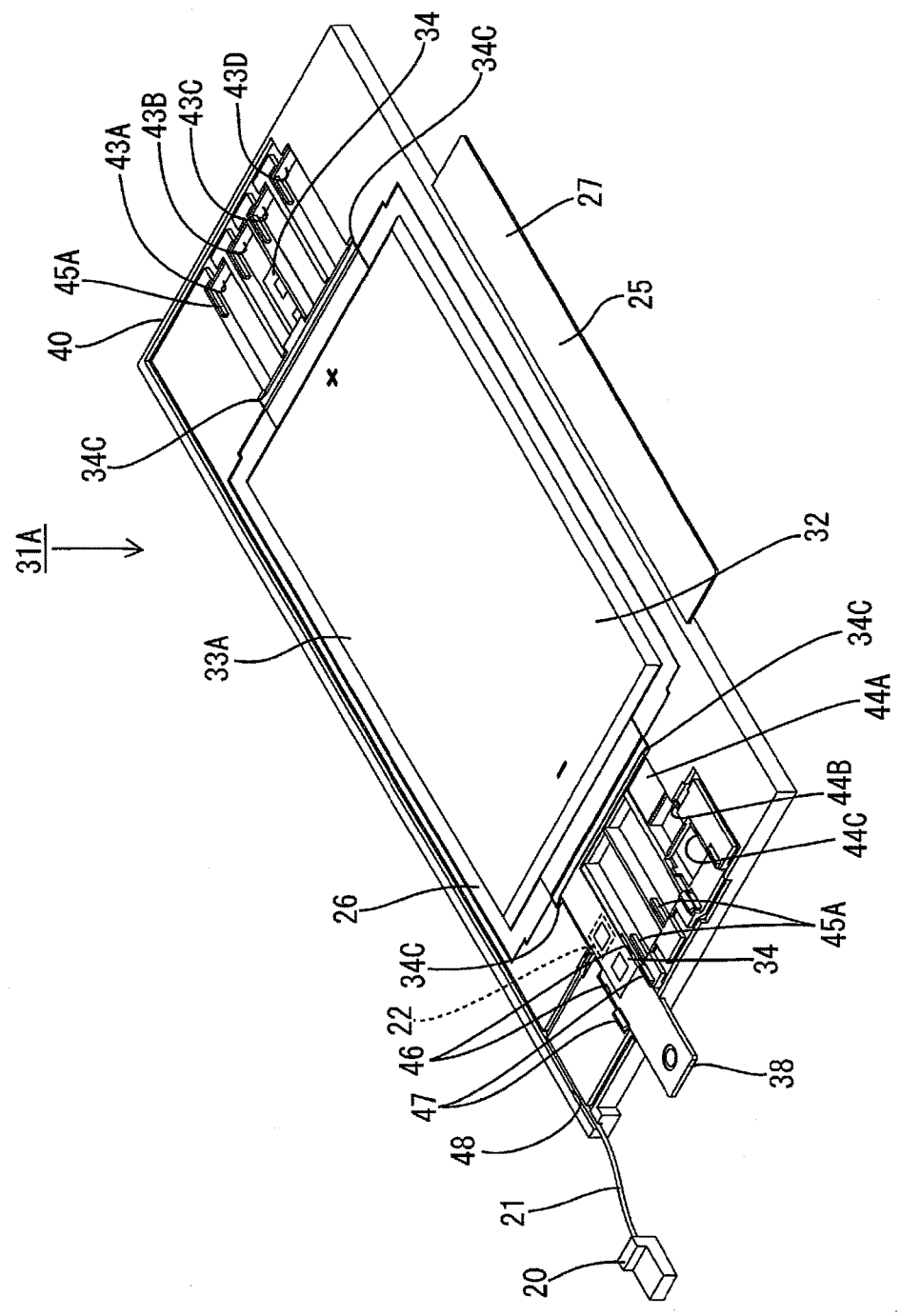
FIG. 6 is a plan view of the battery unit for the top tier.
Figure 7:
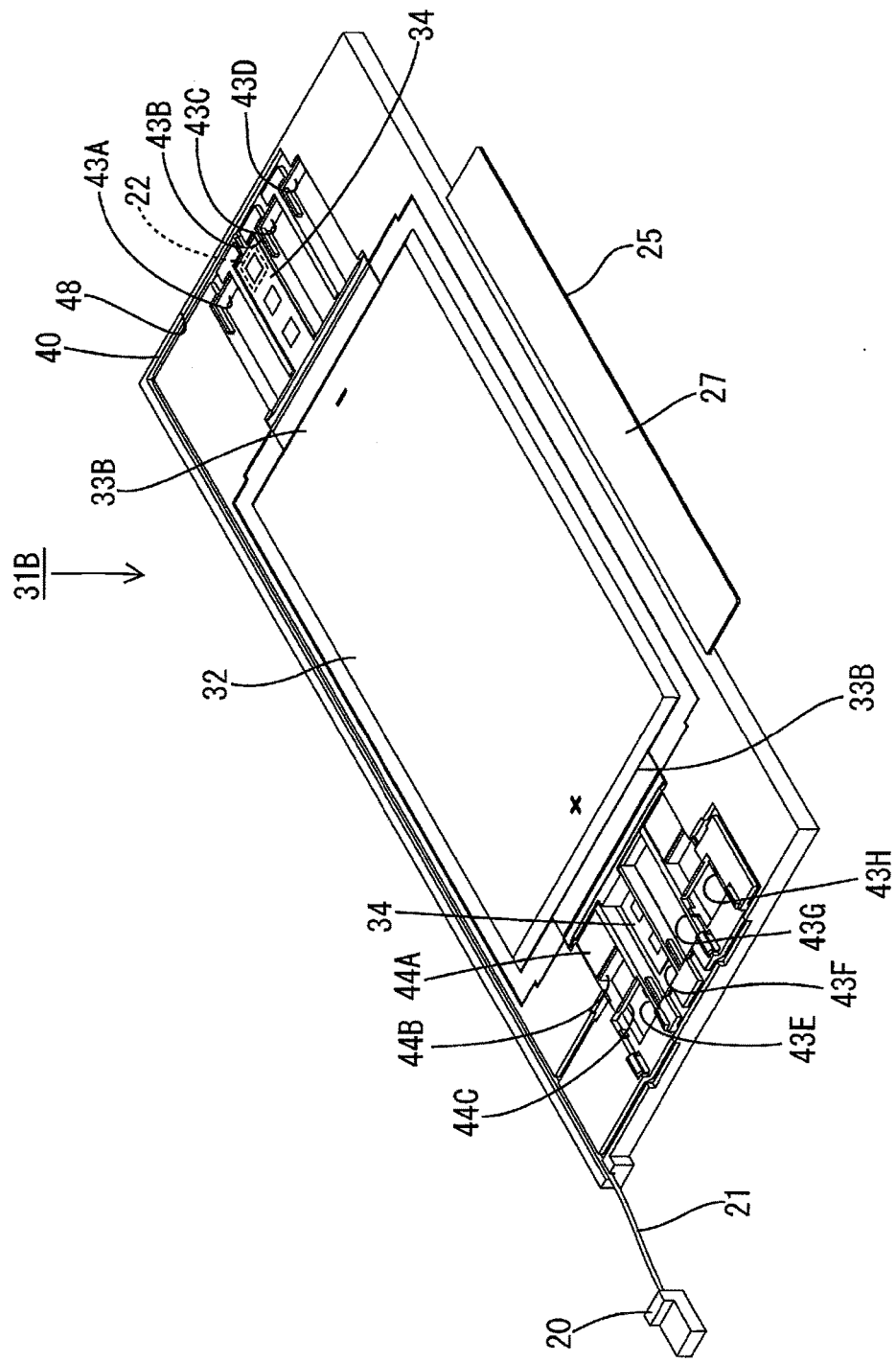
FIG. 7 is a plan view of the battery unit for the second tier.
Figure 8:
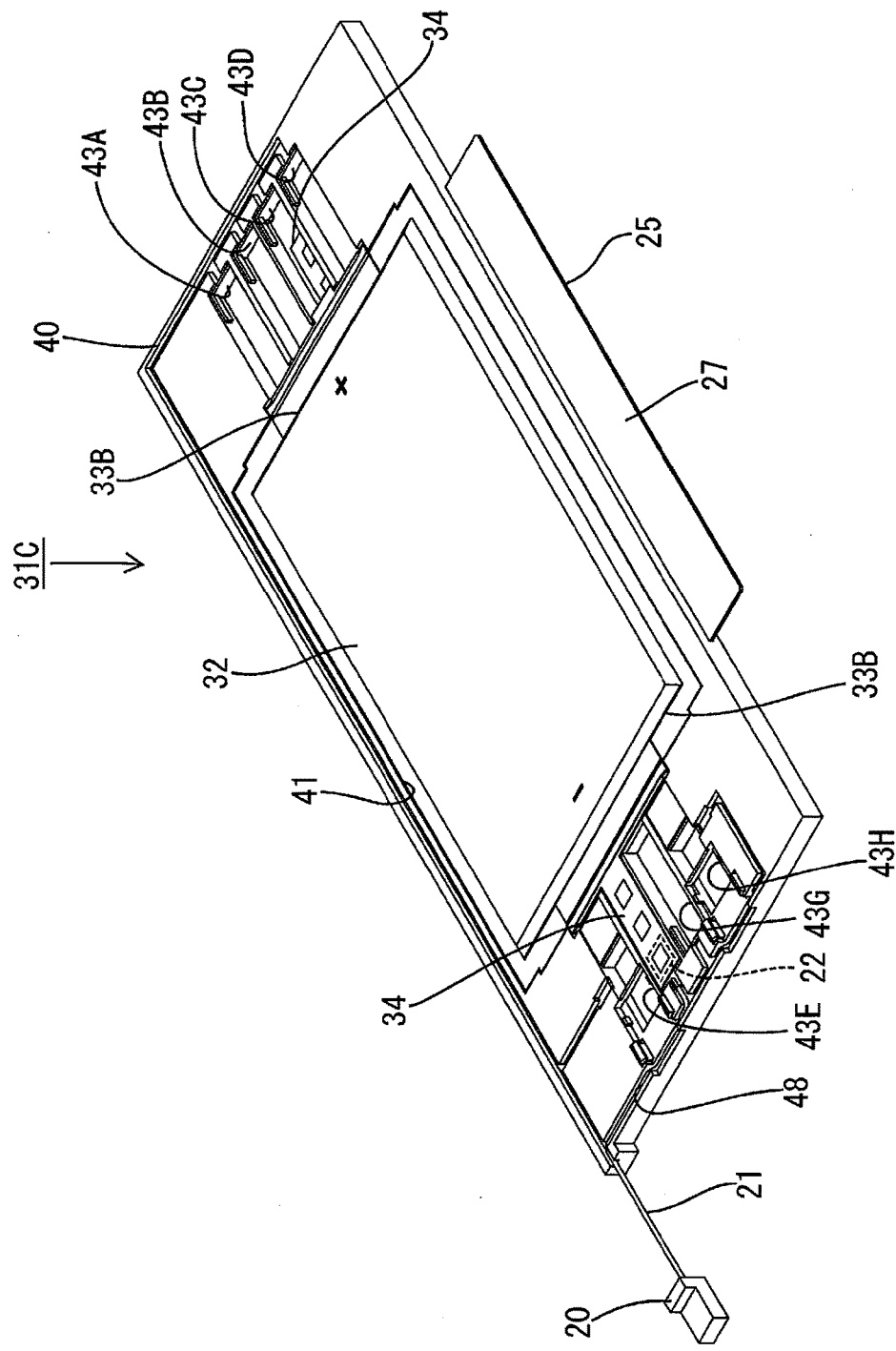
FIG. 8 is a plan view of the battery unit for the third tier.
Figure 9:
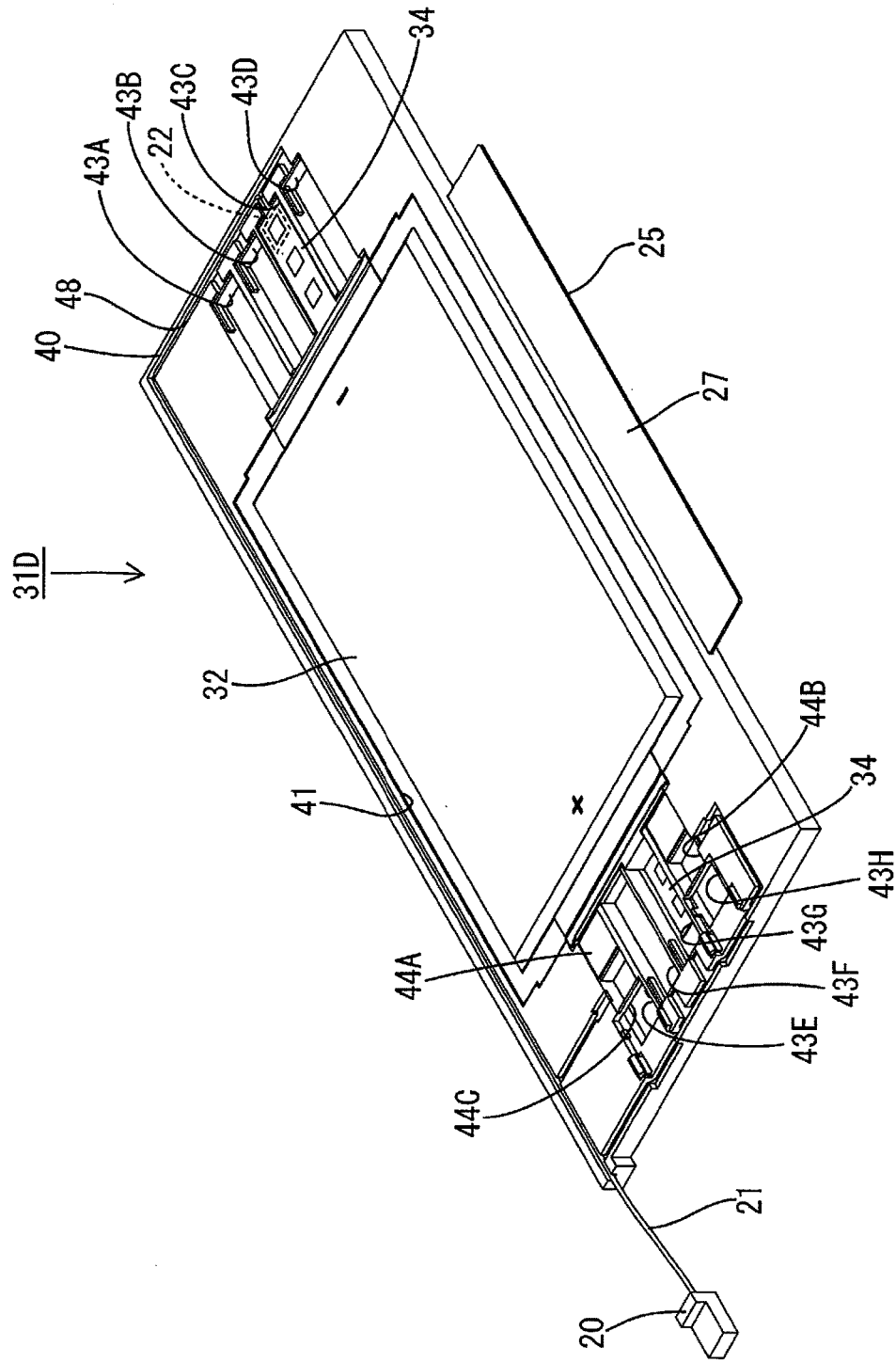
FIG. 9 is a plan view of the battery unit for the fourth tier.
Figure 10:
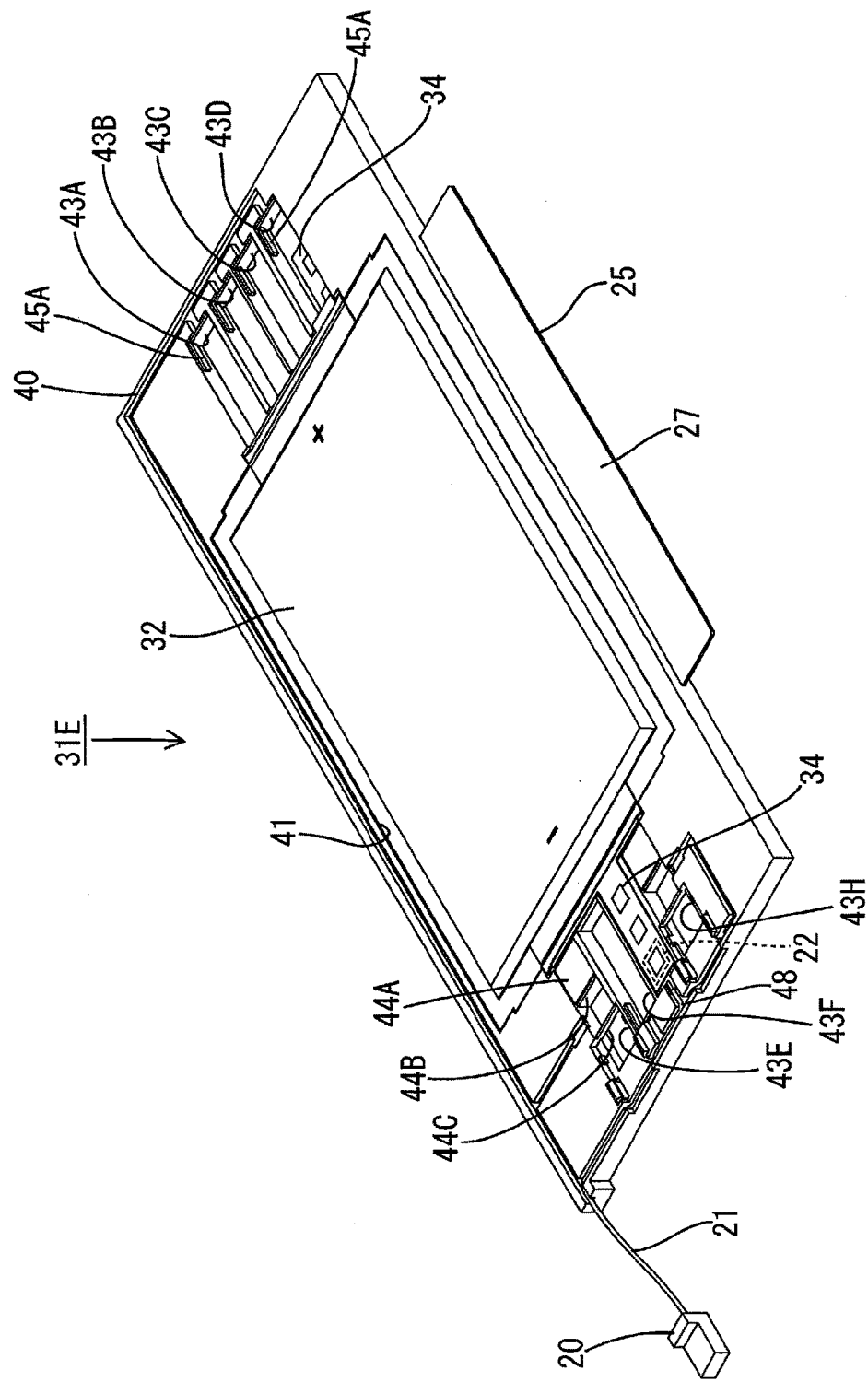
FIG. 10 is a plan view of the battery unit for the fifth tier.
Figure 11:
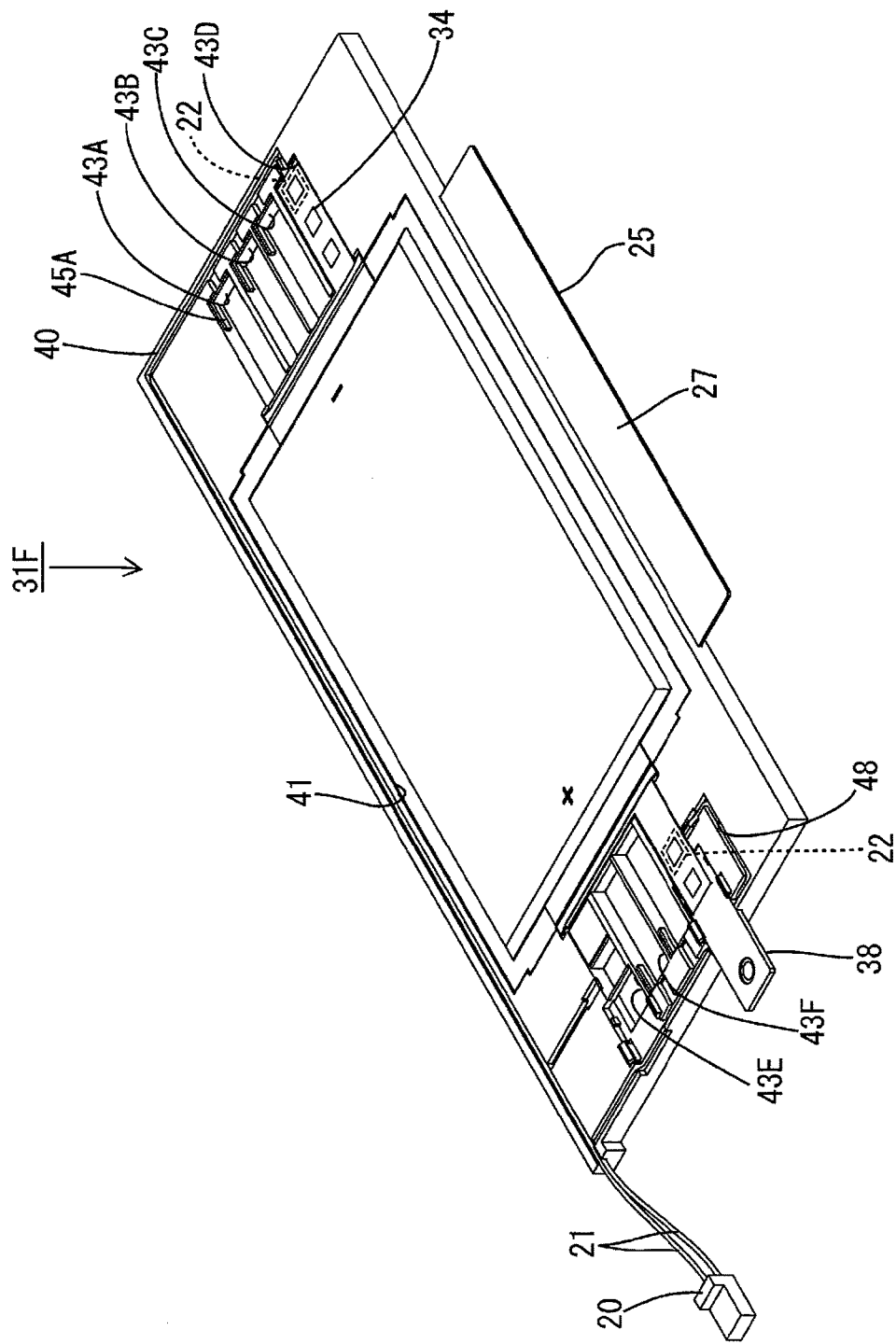
FIG. 11 is a plan view of the battery unit for the sixth tier.
Figure 12:
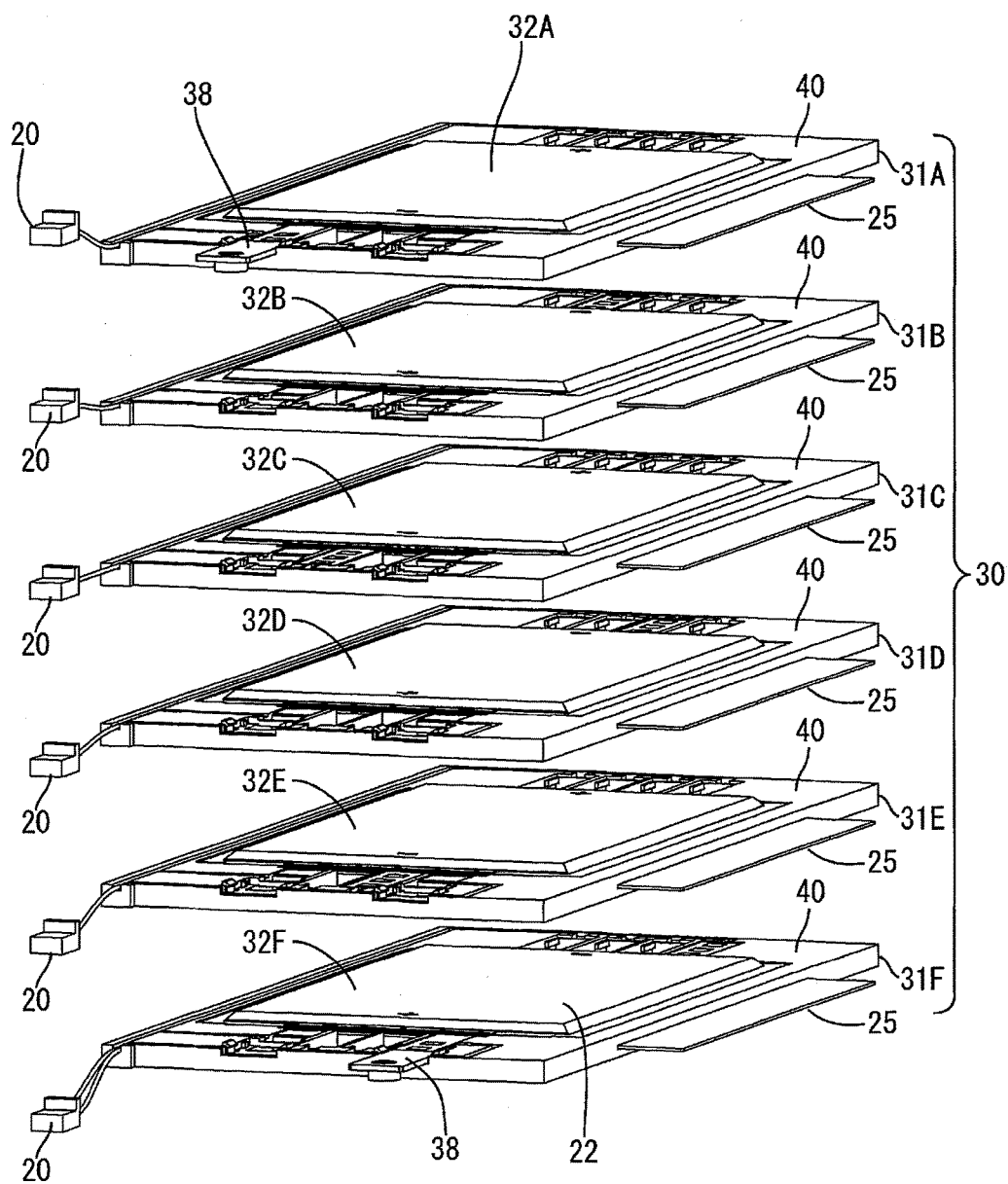
FIG. 12 is a perspective view showing the arrangement of the six tiers of battery units.

FIG. 6 is a view showing the top-tier battery unit 31A from the above, FIG. 7 is a view showing the second-tier battery unit 31B from the above, FIG. 8 is a view showing the third-tier battery unit 31C from the above, FIG. 9 is a view showing the fourth-tier battery unit 31D from the above, FIG. 10 is a view showing the fifth-tier battery unit 31E from the above, and FIG. 11 is a view showing the sixth-tier battery unit 31F from the above. FIG. 12 is a view showing the arrangement of the six tiers of battery units 31.

Heat-Transfer Member 25

Figure 5:
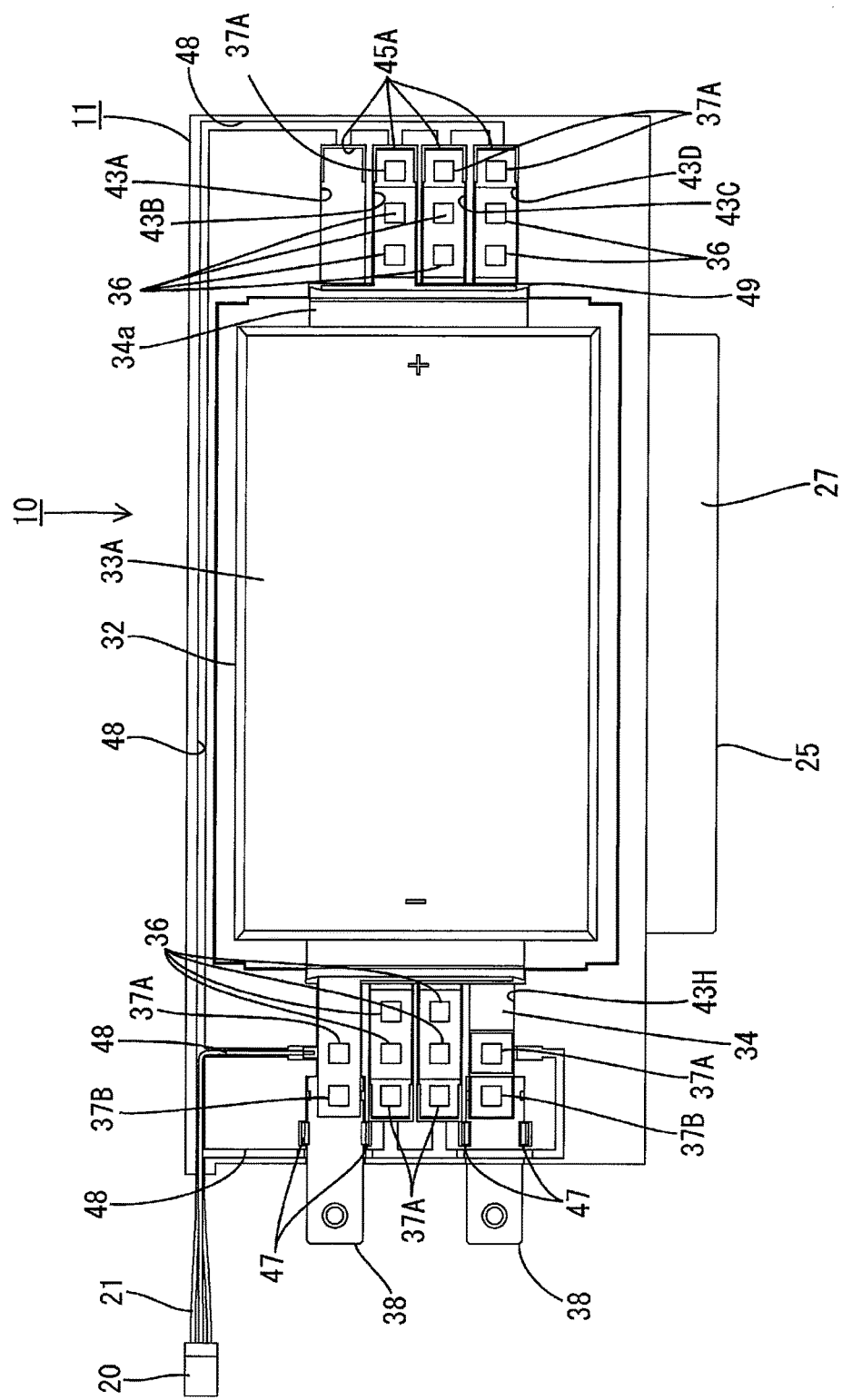
FIG. 5 is a plan view of a stack of electricity storage elements.
Figure 22:
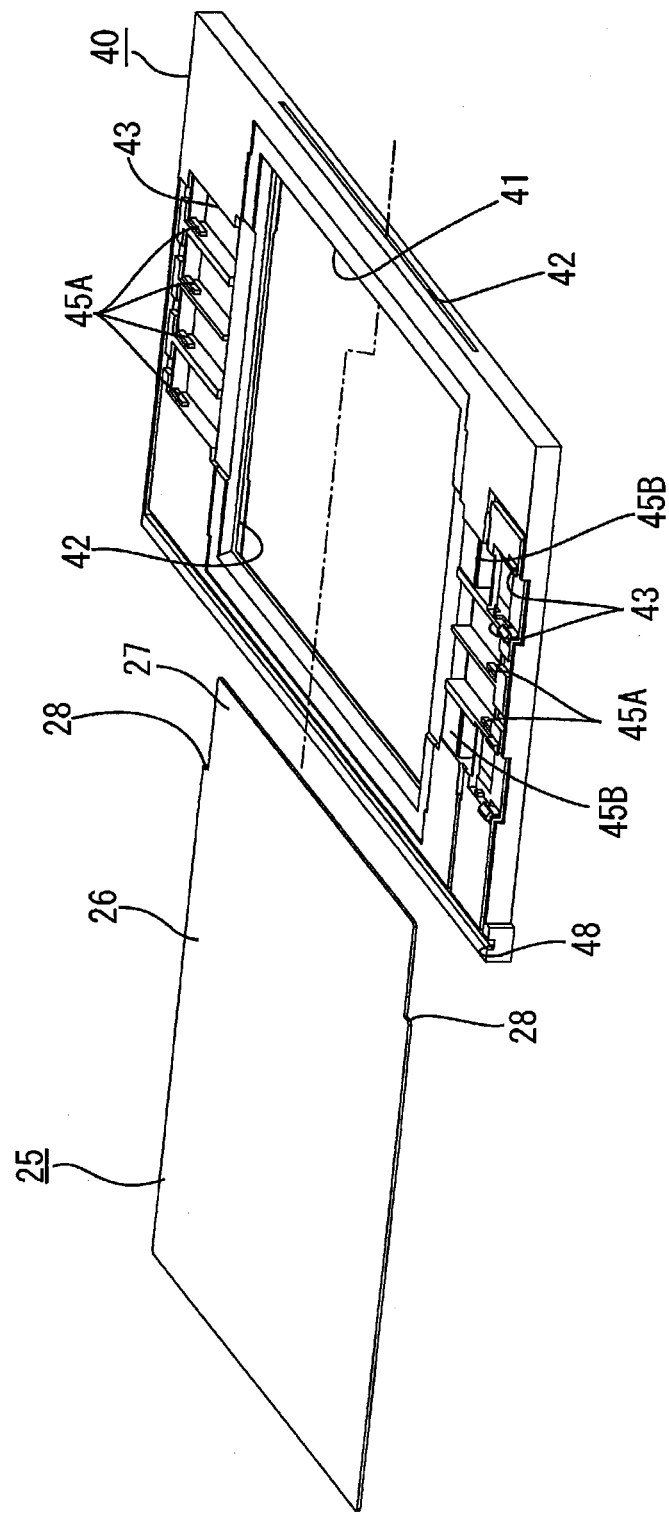
FIG. 22 is a perspective view showing attachment of a heat-transfer member to an insulating holder member.

In each battery unit 31, a heat-transfer member 25 made of aluminum or aluminum alloy is disposed below the electric cell 32. The heat-transfer member 25 has a shape of a plate. As shown in FIGS. 5 and 22, the width dimension of the portion of the heat-transfer member 25 held outside of the insulating holder member 40 (the exposed region 27) is smaller than that of the portion of the heat-transfer member 25 held in the insulating holder member 40 (the held region 26).

Flange portions 28 having a shape of a flange are formed on the portion of the heat-transfer member 25 that extends from the exposed region 27 with a smaller width dimension to the held region 26 with a greater width dimension. As the flange portions 28 are engaged by and secured within the insulating holder member 40, the heat-transfer member 25 is held by the insulating holder member 40.

The heat generated in the electric cell 32 can be conducted to the heat-transfer member 25 and dissipated to the air from the exposed region 27 of the heat-transfer member 25. It should be noted that it is also possible to dissipate the heat generated in the electric cell 32 by keeping the exposed region 27 of the heat-transfer member 25 in contact with a body panel or the body frame.

Insulating Holder Member 40

The insulating holder members 40, which hold the heat-transfer members 25, are made of an insulating resin material, and have a shape of a frame as shown in FIG. 22. The rectangular hollowed-out portion of each insulating holder member 40 located at the approximate center is a heat-transfer member disposing portion 41 in which a heat-transfer member 25 is disposed. The heat-transfer member 25 is capable of slidably moved into the heat-transfer member disposing portion 41 of the insulating holder members 40 from a longitudinal end of the insulating holder members 40, and slide grooves 42 into which the heat-transfer member 25 can be slidably mounted are formed in the end faces of the heat-transfer member disposing portion 41 of the insulating holder member 40.

Formed in the insulating holder member 40 is a wire accommodating groove 48 that accommodates a wire 21 with a voltage detection terminal 22 attached to one end thereof. As shown in FIG. 5, the wire accommodating groove 48 is formed along one of the longitudinal edges of the insulating holder member 40 and the pair of widthwise edges of the insulating holder member 40 and branches off toward and is connected with windows 43 formed at the front. The front end of the wire accommodating groove 48 protrudes forward of any other part of the insulating holder member 40, and its rear end is open so as to draw the wire 21 out of the insulating holder member 40.

As shown in FIGS. 6-11, formed at the edges of the heat-transfer member disposing portion 41 of the insulating holder members 40 are recesses 49 into which corners 34c of a wide region 34a of the lead terminals 34 are fitted. The movement of the lead terminal 34 (the electric cell 32) is restricted by the corners 34c of the lead terminal 34 fitting into the recesses 49.

Four windows 43 in which lead terminals 34 are disposed are formed on both sides (the front and the rear) of the heat-transfer member disposing portion 41 of the insulating holder member 40 (see FIG. 5). The rear windows 43 are referred to as a first window 43A, a second window 43B, a third window 43C, and a fourth window 43D arranged in that order from the top in FIG. 5, and the front windows 43 are referred to as a fifth window 43E, a sixth window 43F, a seventh window 43G, and an eighth window 43H arranged in that order from the top in FIG. 5.

C-shaped mounting protrusions 45A on the end faces of which the lead terminals 34 are mounted are provided in the four rear (to the right in FIG. 5) windows 43 (the first window 43A, the second window 43B, the third window 43C, and the fourth window 43D). The lead terminals 34 are mounted as is or in a folded condition in the windows 43 at a predetermined position.

The C-shaped mounting protrusions 45A on the end faces of which the lead terminals 34 are mounted are provided in the two windows 43F and 43G (the sixth window 43F and the seventh window 43G) of the four front (to the left in FIG. 5) windows 43. The lead terminals 34 are mounted as is or in a folded condition in the windows 43 at a predetermined position.

The two outside windows 43 of the four front windows 43 (the fifth window 43E and the eighth window 43H) are divided into three sections 44. Of the three sections 44, the first section 44A facing the heat-transfer member disposing portion 41 is not penetrated and provided with a mounting portion 45B on which a lead terminal 34 can be mounted. On the center section 44B (the second section 44B), a voltage detection terminal 22 can be mounted and on the outermost section 44 (the third section 44), a busbar 38 can be mounted. The busbar 38 is held in the region that extends from the third section 44C to the front end of the insulating holder member 40. In the aforementioned region, a pair of retainer protrusions 46 that prevent the busbar 38 from dislodging is formed in the third section 44C, and a pair of busbar engaging lugs 47 that engage and secure the busbar 38 is formed at the front of the insulating holder member 40.

Electric Cell 32

The electric cells 32 held by the insulating holder members 40 have an approximate rectangular shape as seen from the above. The widthwise edge portions 33B of the electric cells 32 are held by the insulating holder members 40 and mounted on the heat-transfer members 25 attached to the insulating holder members 40 (see FIGS. 6-12).

As shown in FIGS. 6-11, the electric cells 32 are disposed approximately in parallel with one another so that the outside surfaces having the largest area, i.e., the sides 33A, face upward and downward. This brings the sides 33A, which have the largest area, into contact with the heat-transfer members 25, thus providing excellent heat dissipation. The adjacent electric cells 32 in the direction of stacking are arranged so that lead terminals 34 with different polarities are positioned to oppose one another.

As shown in FIGS. 16-21, each electric cell 32 is a laminated cell. Each electric cell 32 includes an unillustrated generator element, a laminate film 33 that wraps around the generator element and whose edge portions 33B are welded, and lead terminals 34 connected to the generator element and protruding outward from the opposing welded edge portions 33B (the opposing end portions) of the laminate film 33.

Lead Terminal 34

Figure 13:
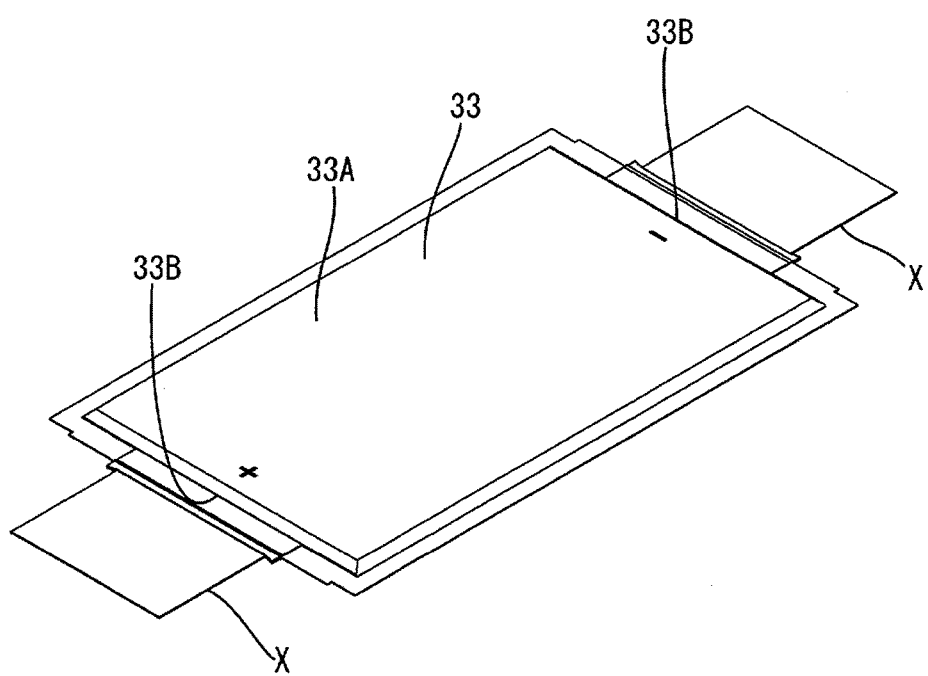
FIG. 13 is a perspective view of an electric cell prior to machining.

FIG. 13 shows an electric cell 32 before the lead terminals 34 are machined. This embodiment employs the electric cells 32 with the lead terminals 34 having the shapes of strips shown in FIGS. 16-21 formed by machining the wide-shaped terminals X shown in FIG. 13. The width dimension of the lead terminals 34 of the electric cells 32 in FIGS. 16-21 is approximately a quarter of that of the terminals in FIG. 13.

Figure 16:
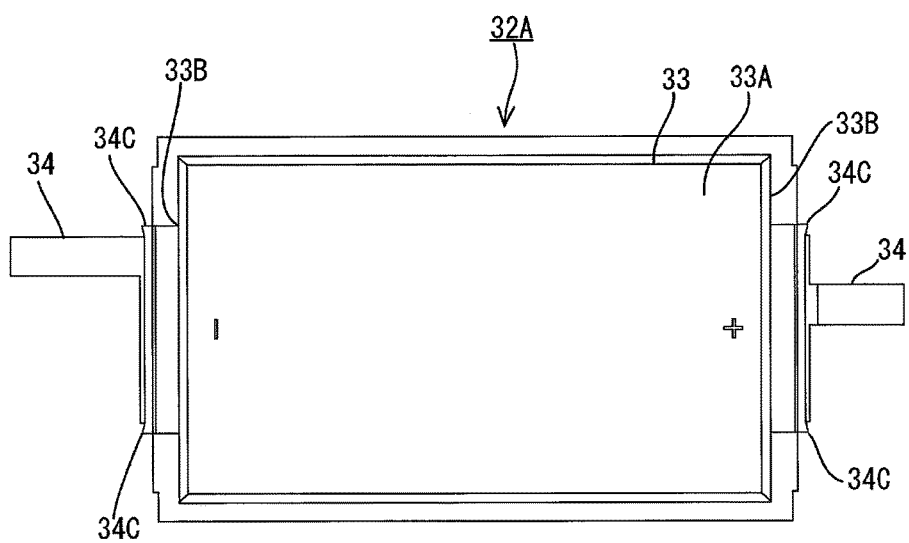
FIG. 16 is a plan view of the electric cell for the top tier.

As shown in FIGS. 6 and 16, in the top-tier electric cell 32, the positive lead terminal 34 is formed in a position where it can be disposed in the second window 43 and is also folded vertically downward, whereas the negative lead terminal 34 is formed in a position where it can be disposed in the fifth window 43.

Figure 17:
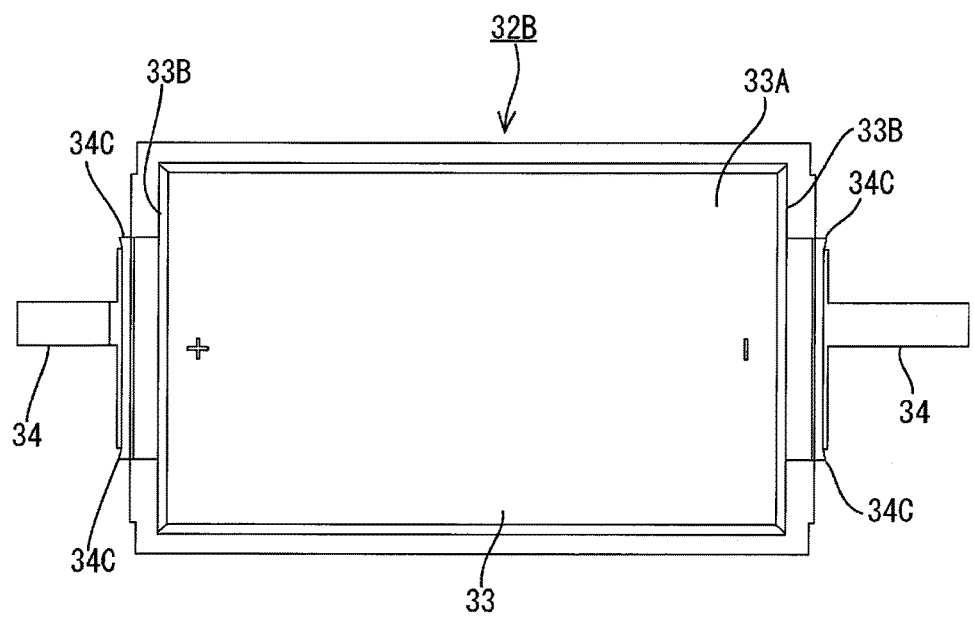
FIG. 17 is a plan view of the electric cell for the second tier.

As shown in FIGS. 7 and 17, in the second-tier electric cell 32, the positive lead terminal 34 is formed in a position where it can be disposed in the sixth window 43 and is also folded vertically downward, whereas the negative lead terminal 34 is formed in a position where it can be disposed in the second window 43.

Figure 18:
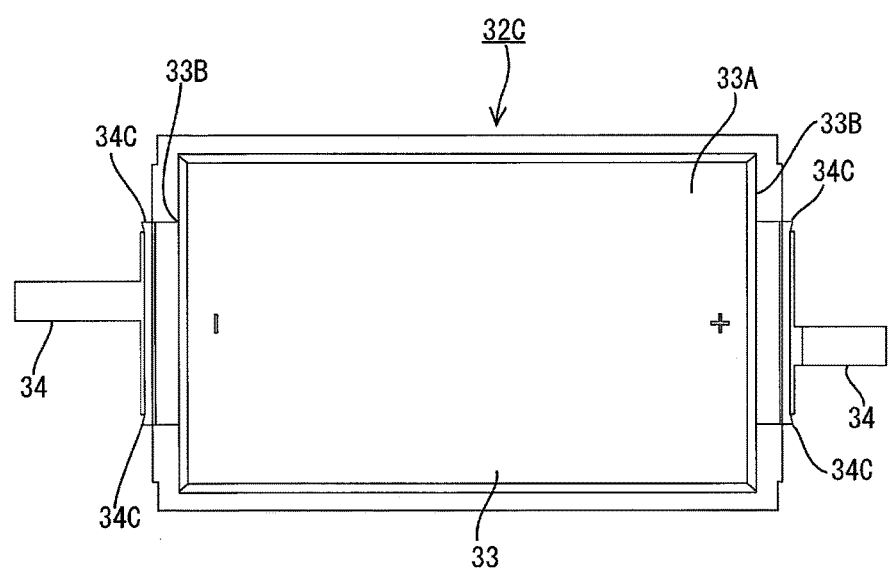
FIG. 18 is a plan view of the electric cell for the third tier.

As shown in FIGS. 8 and 18, in the third-tier electric cell 32, the positive lead terminal 34 is formed in a position where it can be disposed in the third window 43 and is also folded vertically downward, whereas the negative lead terminal 34 is formed in a position where it can be disposed in the sixth window 43.

Figure 19:
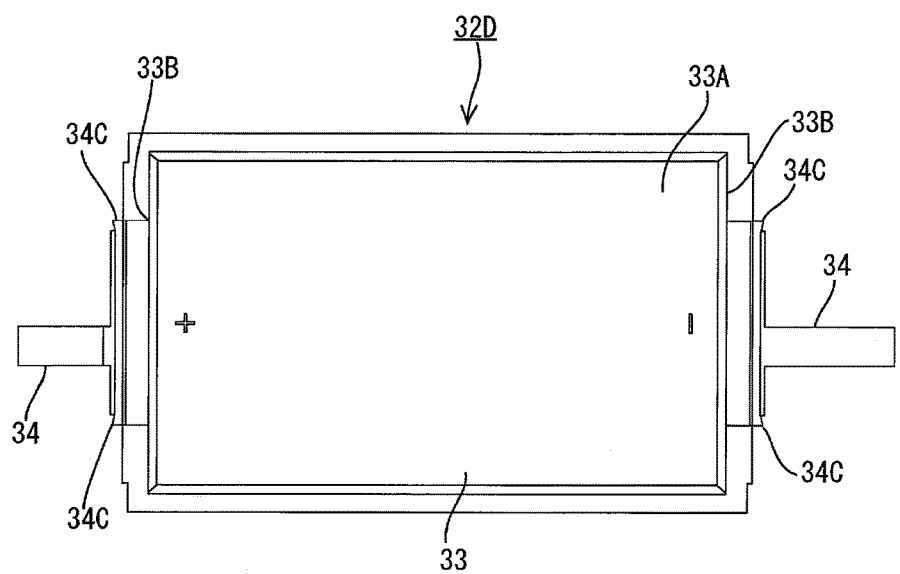
FIG. 19 is a plan view of the electric cell for the fourth tier.

As shown in FIGS. 9 and 19, in the fourth-tier electric cell 32, the positive lead terminal 34 is formed in a position where it can be disposed in the seventh window 43 and is also folded vertically downward, whereas the negative lead terminal 34 is formed in a position where it can be disposed in the third window 43.

Figure 20:
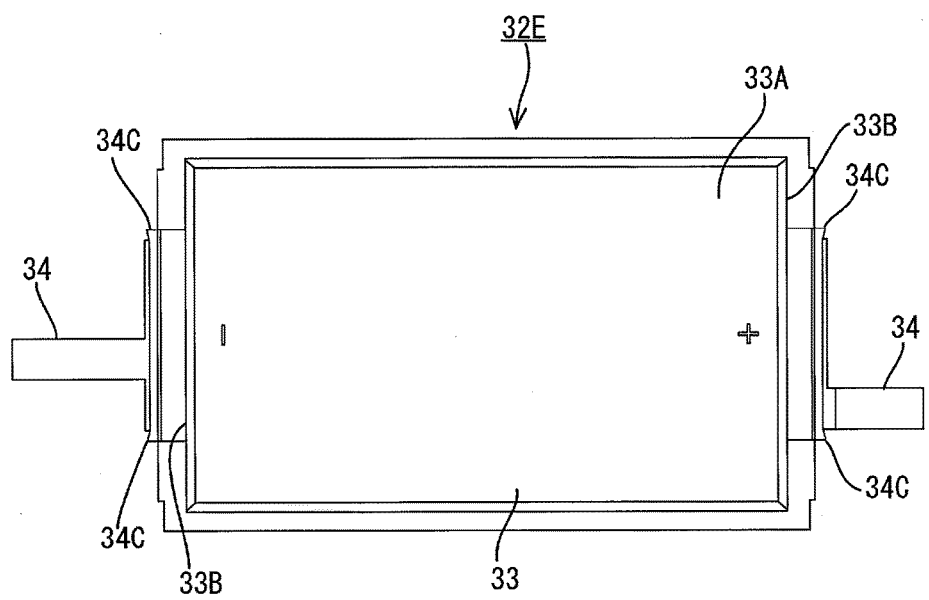
FIG. 20 is a perspective view of the electric cell for the fifth tier.

As shown in FIGS. 10 and 20, in the fifth-tier electric cell 32, the positive lead terminal 34 is formed in a position where it can be disposed in the fourth window 43 and is also folded vertically downward, whereas the negative lead terminal 34 is formed in a position where it can be disposed in the sixth window 43.

Figure 21:
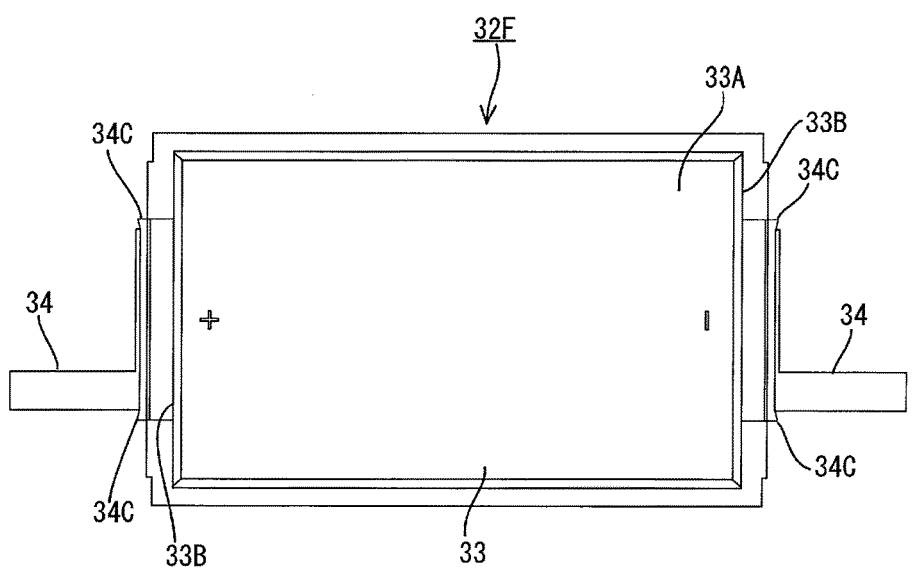
FIG. 21 is a perspective view of the electric cell for the sixth tier.

As shown in FIGS. 11 and 21, in the sixth-tier electric cell 32, the positive lead terminal 34 is formed in a position where it can be disposed in the eighth window 43, whereas the negative lead terminal 34 is formed in a position where it can be disposed in the fourth window 43.

Figure 14:
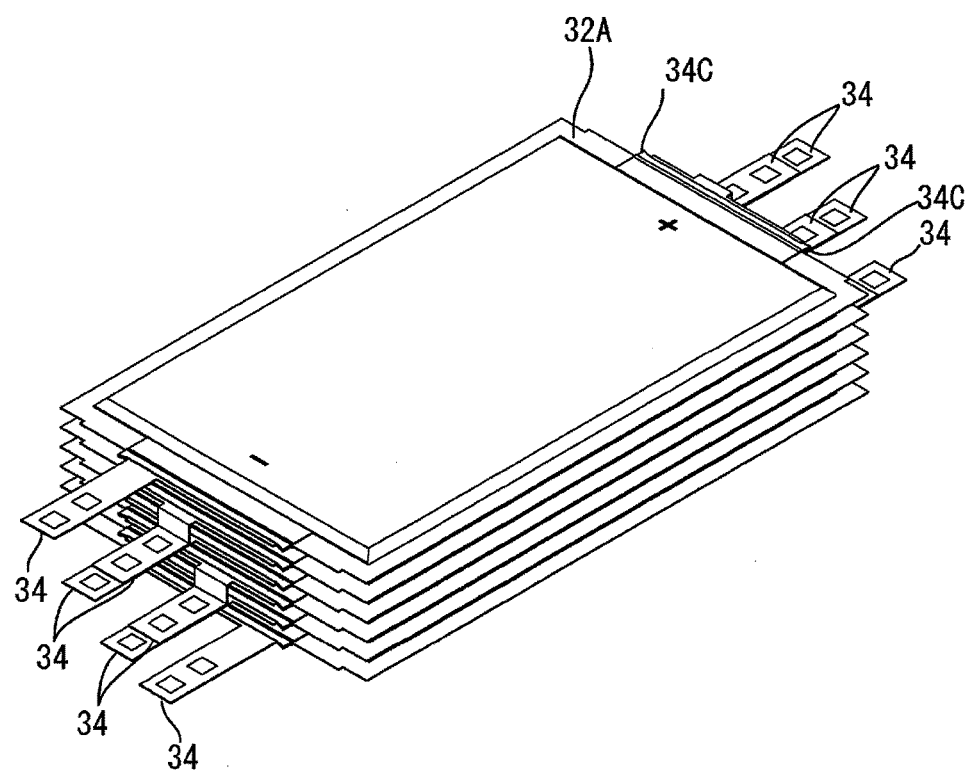
FIG. 14 is a perspective view showing the arrangement of the six electric cells.
Figure 15:
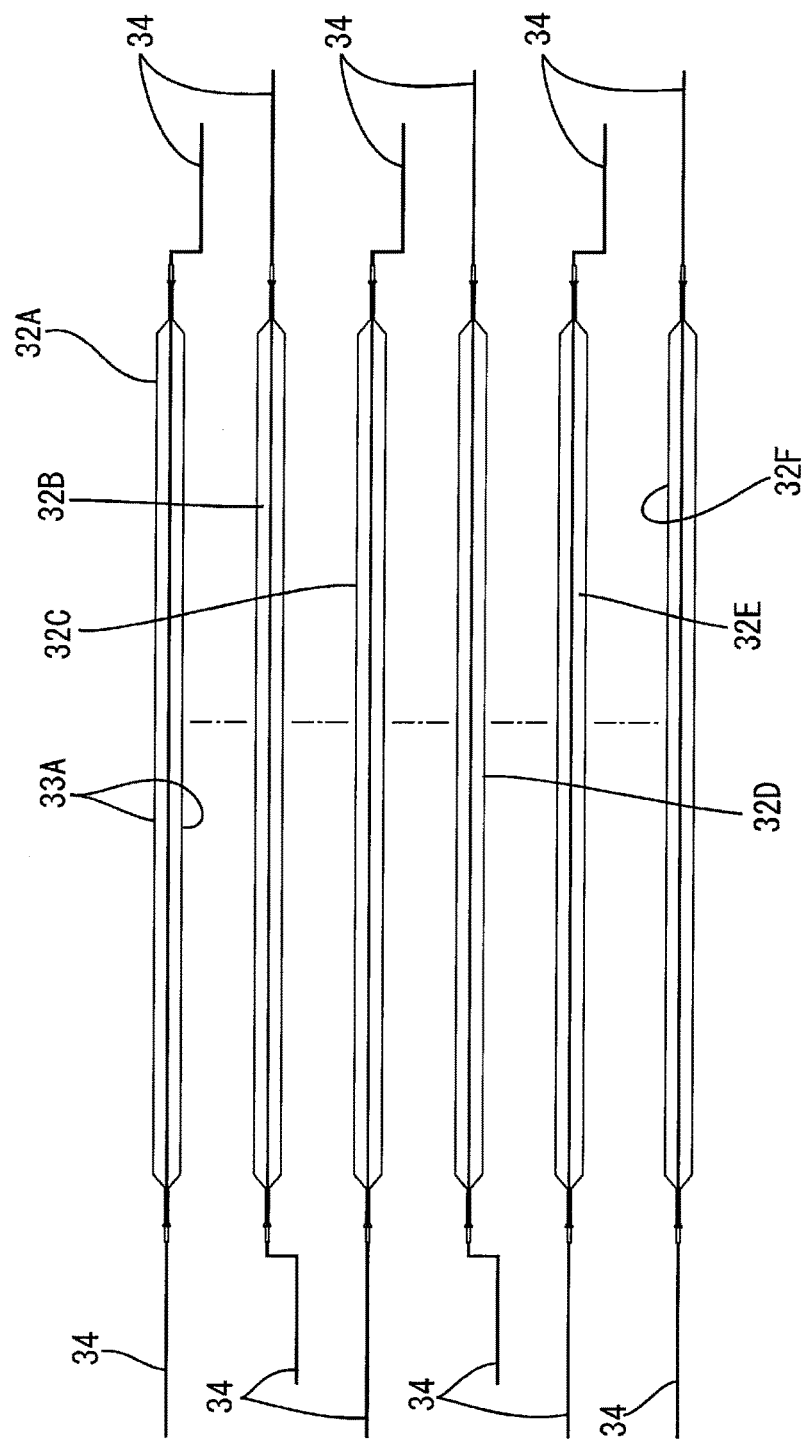
FIG. 15 is a side view showing the arrangement of the six electric cells.

Differently polarized lead terminals 34 of the electric cells 32 adjacent in the stacking direction (the vertical direction) are connected with each other by superimposing the terminals as shown in FIGS. 5, 14, and 15. More particularly, of the adjacent electric cells 32, the lead terminals 34 of the upper electric cells 32 are bent approximately vertically downward to be superimposed on and connected with the lead terminals 34 of the lower electric cells 32 by ultrasonic welding. This is described more specifically below.

The positive lead terminal 34 of the top-tier electric cell 32 and the negative lead terminal 34 of the second-tier electric cell 32 are superimposed on and connected with each other by ultrasonic welding in the second window 43.

The positive lead terminal 34 of the second-tier electric cell 32 and the negative lead terminal 34 of the third-tier electric cell 32 are superimposed on and connected with each other by ultrasonic welding in the sixth window 43.

The positive lead terminal 34 of the third-tier electric cell 32 and the negative lead terminal 34 of the fourth-tier electric cell 32 are superimposed on and connected with each other by ultrasonic welding in the third window 43.

The positive lead terminal 34 of the fourth-tier electric cell 32 and the negative lead terminal 34 of the fifth-tier electric cell 32 are superimposed on and connected with each other by ultrasonic welding in the seventh window 43.

The positive lead terminal 34 of the fifth-tier electric cell 32 and the negative lead terminal 34 of the sixth-tier electric cell 32 are superimposed on and connected with each other by ultrasonic welding in the fourth window 43.

A voltage detection terminal 22 and a busbar 38 are connected to the negative lead terminal 34 of the top-tier electric cell 32A in positions shifted in the direction of protrusion.

A voltage detection terminal 22 is connected by ultrasonic welding to each of the negative lead terminal 34 of the second-tier electric cell 32B, the negative lead terminal 34 of the third-tier electric cell 32C, the negative lead terminal 34 of the fourth-tier electric cell 32D, the negative lead terminal 34 of the fifth-tier electric cell 32E, and the negative lead terminal 34 of the sixth-tier electric cell 32F.

The connecting portion 37A between each of these negative lead terminals 34 and the voltage detection terminal 22 (the detection terminal connecting portions 37A) is provided outward of the connecting portion 36 between that negative lead terminal 34 and the positive lead terminal 34 of the electric cell 32 adjacent to that negative lead terminal 34 (i.e., provided in a location shifted in the direction of the protrusion of the lead terminals 34).

A voltage detection terminal 22 and a busbar 38 are connected to the positive lead terminal 34 of the sixth-tier electric cell 32 in positions shifted in the direction of protrusion. In the drawings, the connecting portion between the lead terminal 34 and the busbar 38 is designated with the reference numeral 37B.

As shown in FIGS. 6-11, a wide region 34a is provided at the end from which the lead terminals 34 protrude, and the movement of the electric cells 32 is restricted by the corners 34c of the wide region 34a fitting into the recesses 49.

Busbar 38

Figure 4:
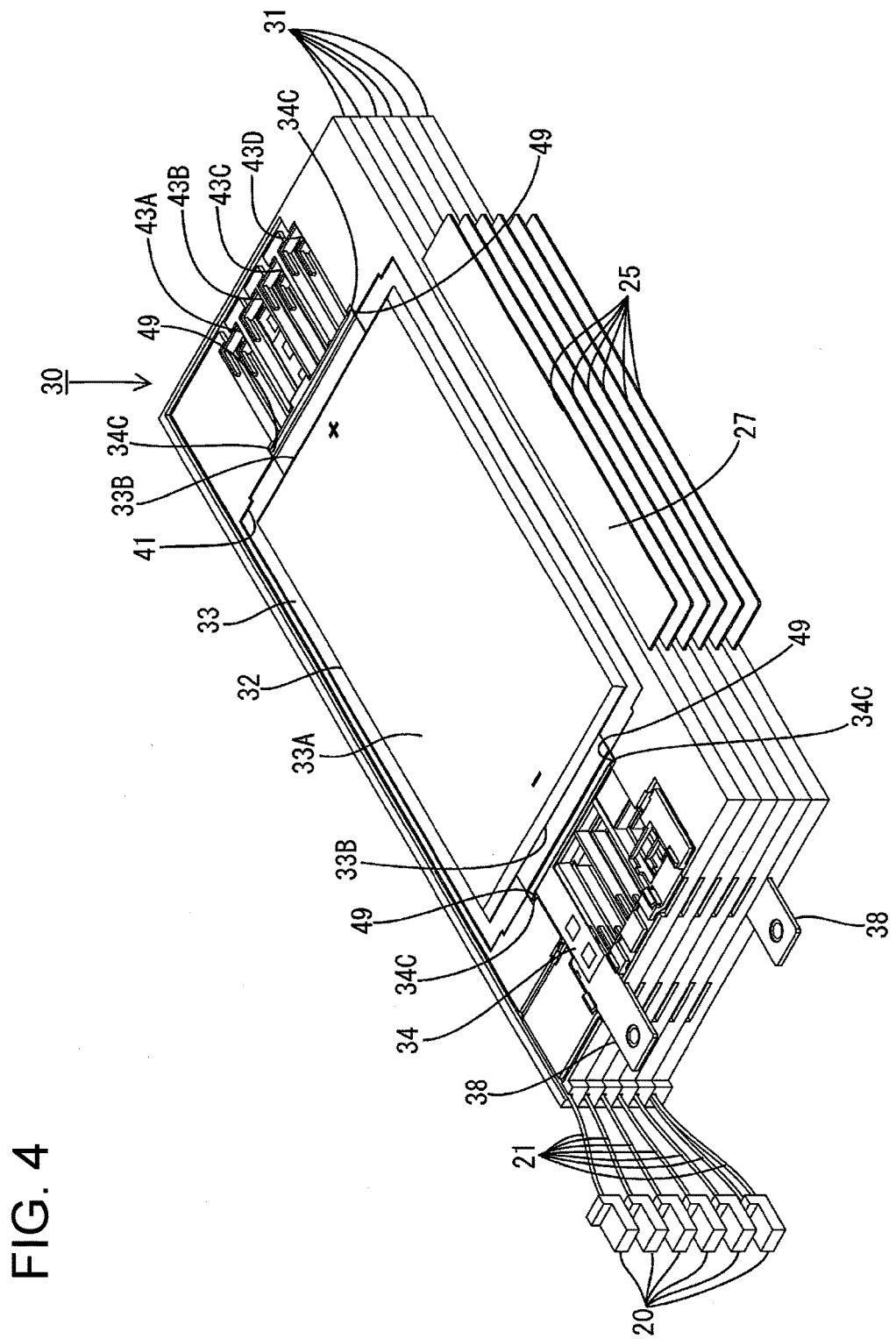
FIG. 4 is a perspective view of a stack of electricity storage elements.

The busbar 38 connected to the uppermost electric cell 32A (the second busbar 38B) is a terminal 38B that serves as the anode of the battery module 10, whereas the busbar 38 connected to the lowermost electric cell 32F (the first busbar 38A) is a terminal 38A that serves as the cathode of the battery module 10 (see FIG. 4). Each busbar 38 is made of a conductive material, such as copper or copper alloy, etc., and the portion 39 drawn out of the busbar draw-out port 19 of the lid portion 18 is the terminal portion 39 for connection to external equipment.

Assembly of the Battery Module 10 of the Embodiment

Figure 23:
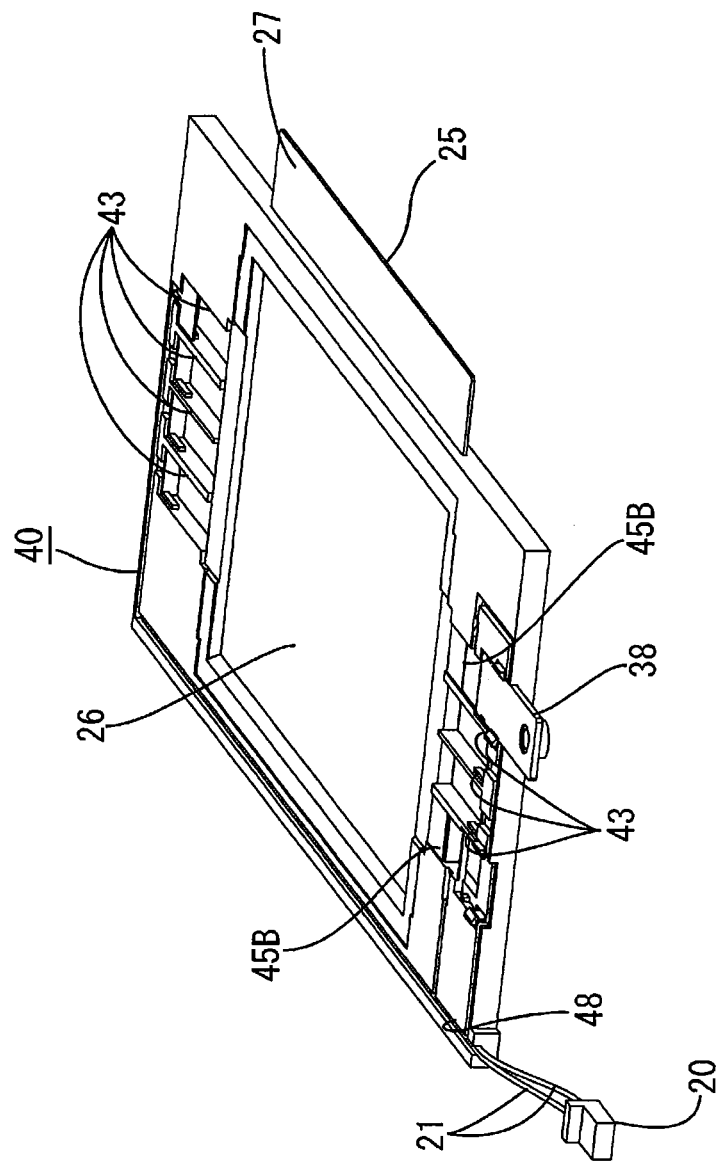
FIG. 23 is a perspective view of an insulating holder member with a heat-transfer member and a voltage detection terminal attached thereto.
Figure 24:
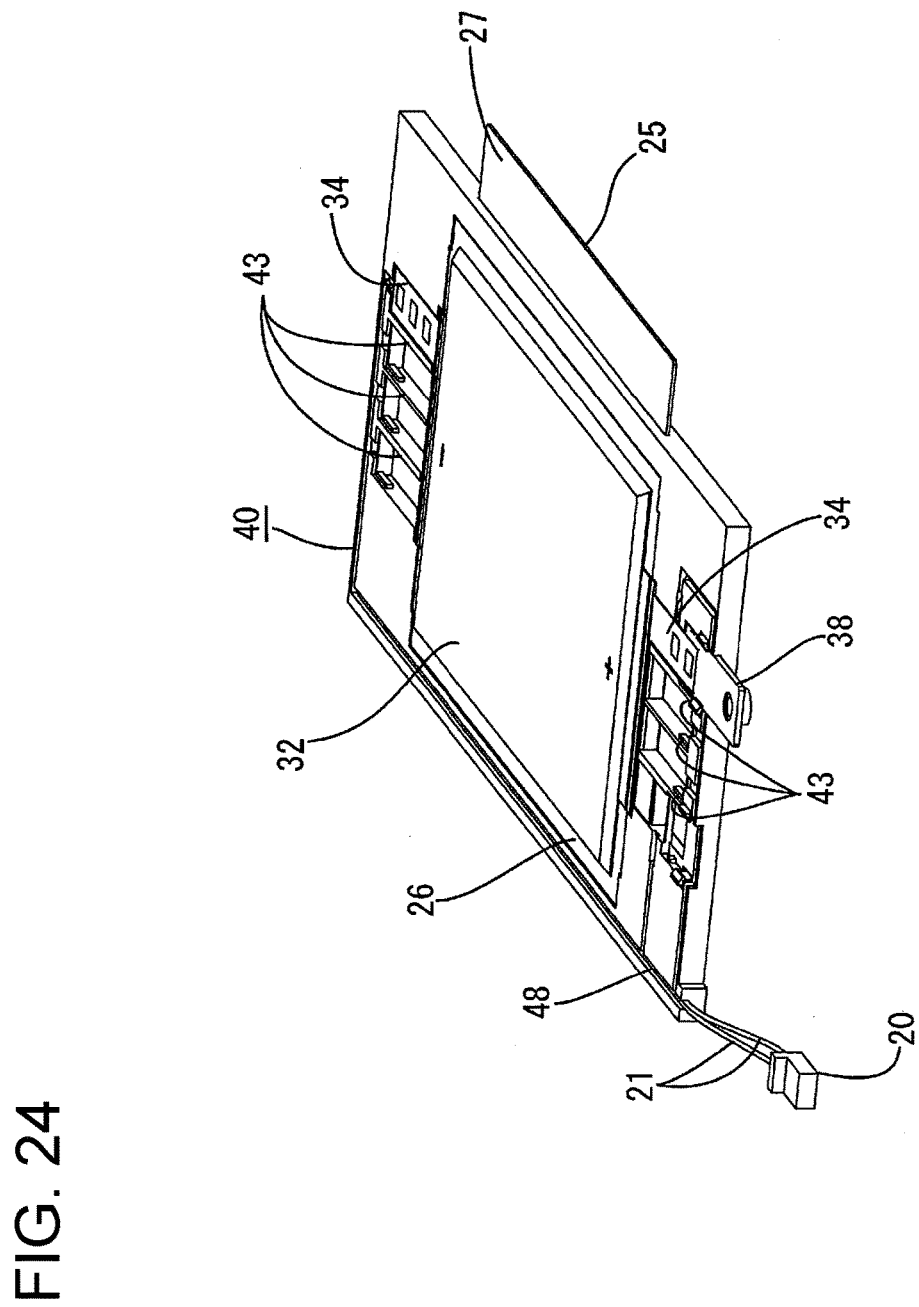
FIG. 24 is a perspective view showing an electric cell mounted on an insulating holder member.

One unit of each of the electric cells 32 shown in FIGS. 16-21, or altogether six electric cells 32 are prepared. The heat-transfer members 25 are attached to the insulating holder members 40 in advance by fitting the heat-transfer member 25 into the slide grooves 42 of the insulating holder members 40 and engaging the flange portions 28 with the insulating holder members 40 (see FIGS. 22 and 23). Six units of the insulating holder member 40 with a heat-transfer member 25 attached thereto shown in FIG. 23 are prepared.

Next, a voltage detection terminal 22 is disposed in the predetermined window 43 of each insulating holder member 40, a wire 21 is accommodated in the wire accommodating groove 48, and the end of the wire 21 to be connected to the connector 20 is drawn out of the front end of the wire accommodating groove 48.

The windows 43 in which a voltage detection terminal 22 is disposed are the fifth window 43 of the top-tier insulating holder member 40, the second window 43 of the second-tier insulating holder member 40, the sixth window 43 of the third-tier insulating holder member 40, the third window 43 of the fourth-tier insulating holder member 40, the seventh window 43 of the fifth-tier insulating holder member 40, and the fourth and eighth windows 43 of the sixth-tier insulating holder member 40.

Next, busbars 38 are attached to the fifth window 43 of the top-tier insulating holder member 40 and the eighth window 43 of the sixth-tier insulating holder member 40.

The busbars 38 are attached as described below. Upon insertion of a busbar 38 into a predetermined window 43 provided with a pair of retainer protrusions 46 and a pair of busbar engaging lugs 47, the busbar 38 is brought into abutment with the retainer protrusions 46 and the busbar engaging lugs 47, causing the retainer protrusions 46 and the busbar engaging lugs 47 to deform outward. When the busbar 38 is fitted onto the mounting surface of the insulating holder member 40, the retainer protrusions 46 and the busbar engaging lugs 47 elastically return to restrict the upward movement of the busbar 38 and prevents it from dislodging.

Next, the electric cells 32 are mounted on the heat-transfer members 25, and the electric cells 32 are held by the insulating holder members 40. By fitting the corners 34c of the lead terminals 34 into the recesses 49 of each insulating holder member 40, each electric cell 32 is held on the recesses 49 so as to restrict the movement of the electric cell 32.

As shown in FIG. 12, by stacking the six battery units 31 starting with the lowermost tier, differently polarized lead terminals 34 of vertically adjacent two of the electric cells 32 are superimposed on each other. One pair of the differently polarized lead terminals 34 of the vertically adjacent two of the electric cells 32 is disposed in one window 43 (see FIG. 5).

Next, the superimposed portions of the adjacent two of the electric cells 32, the superimposed portions of the lead terminals 34 and the voltage detection terminals 22, and the superimposed portions of the lead terminals 34 and the busbars 38 are joined by ultrasonic welding. This joining operation forms connecting portions 36 in which the adjacent two of the differently polarized lead terminals 34 are connected, detection terminal connecting portions 37A in which the lead terminals 34 and the voltage detection terminals 22 are connected, and connecting portions 37B in which the lead terminals 34 and the busbars 38 are connected.

The stack 30 thus obtained and shown in FIGS. 4 and 5 is inserted into the main case body 12 via the opening 13. At the same time, the exposed region 27 of each heat-transfer member 25 is inserted into a slit 14.

When the rear ends of the exposed regions 27 of the heat-transfer members 25 reach the rear ends of the slits 14, the accommodation of the stack 30 in the main case body 12 is completed. Subsequently, the lid portion 18 is attached to the opening 13 at the front of the main case body 12. To attach the lid portion 18, the busbars 38 protruding from the stack 30 are passed through the busbar draw-out ports 19 in the lid portion 18. Upon completion of the attachment of the lid portion 18, the battery module 10 shown in FIGS. 1 and 2 is obtained.

Operation and Effects of the Embodiment

The operation and effects of this embodiment will be described hereinafter.

According to this embodiment, the connecting portions 36 formed by connecting differently polarized lead terminals 34 of adjacent electric cells 32 are disposed in positions shifted as seen from the stacking direction of the stack 30, and the insulating holder members 40 are provided with windows 43 that correspond to the connecting portions 36. Accordingly, once a plurality of electric cells 32, in which the lead terminals 34 for connection with the adjacent electric cells 32 are disposed in the windows 43, are stacked together and the lead terminals 34 disposed in the windows 43 are connected by ultrasonic welding, connecting portions 36 that connect the lead terminals 34 are formed to allow for electrical connection of the plurality of electric cells 32.

In this embodiment, a connecting portion 36 between lead terminals 34 is held on an insulating holder member 40 in a position shifted from the connecting portions 36 between the other lead terminals 34 as seen from the stacking direction of the stack 30. Accordingly, the insulation between the connecting portions 36 is maintained. As a result, as this embodiment allows for connection of a plurality of electric cells 32 in the form of a stack 30 while maintaining insulation, a battery module 10 with excellent connectability can be provided.

Moreover, according to this embodiment, a voltage detection terminal 22 for detecting the voltage of an electric cell 32 is connected to a lead terminal 34 of the electric cells 32 to be subjected to detection. Also, a detection terminal connecting portion 37A formed by connecting the voltage detection terminal 22 to the lead terminal 34 is provided in a location shifted in the direction of the protrusion of the lead terminal 34 with respect to the connecting portion 36 between the lead terminal 34 to which that voltage detection terminal 22 is connected and the lead terminal 34 of an adjacent electric cell 32. Accordingly, not only can the lead terminals 34 and the voltage detection terminals 22 be connected in a stacked condition, but also the connection can be done simultaneously with the connection of the lead terminals 34, thus allowing for excellent connectability.

Furthermore, according to this embodiment, as wires 21 connected to control equipment that detects the voltage of the electric cells 32 and performs control operation are connected to the voltage detection terminals 22 and the insulating holder members 40 are provided with wire accommodating grooves 48 that accommodate the wires 21, the battery module 10 can be automatically assembled, thus improving the ease of assembly.

Furthermore, according to this embodiment, heat-transfer members 25 that are held by the insulating holder members 40 and conduct the heat generated by the electric cells 32 are provided, the heat dissipation of the battery module 10 can be improved.

Furthermore, according to this embodiment, as the insulating holder members 40 are provided with slide grooves 42 into which the heat-transfer members 25 are slidably mounted, the heat-transfer member 25 can be attached to the insulating holder members 40 more efficiently.

Furthermore, according to this embodiment, a case 11 for accommodating the stack 30 is provided and slits 14 for holding the heat-transfer members 25 at intervals are provided in the case 11. As the heat-transfer members 25 are held at intervals, the heat generated by the electric cells 32 are prevented from being trapped inside, resulting in improved heat dissipation.

Furthermore, according to this embodiment, busbars 38 electrically connected with external equipment are connected to lead terminals 34 of electric cells 32, and the insulating holder members 40 are provided with busbar holder portions for holding the busbars 38. Accordingly, the lead terminals 34 and the busbars 38, which are to be electrically connected to external equipment, can be connected together while the busbars 38 are held by the busbar holder portions (the retainer protrusions 46 and the busbar engaging lugs 47) of the insulating holder members 40. Moreover, as the busbars 38 and the lead terminals 34 can be connected when connecting the lead terminals 34, the workability is improved.

Other Embodiments

The present disclosure is not limited to the embodiments described in connection with the foregoing description and drawings. For example, the following embodiments also fall under the technical scope of the present disclosure.

(1) Although the foregoing embodiment shows insulating holder members 40 provided with a wire accommodating groove 48 that accommodates a wire 21 connected to a voltage detection terminal 22, insulating holder members 40 without any wire accommodating groove 48 will also be sufficient.

(2) Although the foregoing embodiment shows a battery module 10 provided with heat-transfer members 25 that are held by the insulating holder members 40 and conduct the heat generated by the electric cells 32, a module without any heat-transfer members will also suffice.

(3) Although the foregoing embodiment shows insulating holder members 40 provided with slide grooves 42 into which the heat-transfer members 25 are slidably mounted, the heat-transfer members may have any structure other than that permits slidable mounting.

(4) Although the foregoing embodiment shows a case 11 provided with slits 14 (heat-transfer member holder portions) capable of holding the heat-transfer members 25 at intervals, the case is not so limited. For example, mounting grooves into which the heat-transfer members are slidably mounted may be formed on the inner wall surfaces of the case so as to hold the plurality of heat-transfer members at intervals.

(5) Although the foregoing embodiment shows that busbars 38 that are electrically connected with external equipment are connected to the electric cells 32 and that the insulating holder members 40 are provided with busbar holder portions 46 and 47, insulating holder members without busbar holder portions will also be sufficient.

(6) Although the foregoing embodiment shows an example in which the electricity storage elements are batteries, they may be capacitors.

(7) Although the foregoing embodiment shows laminated batteries as an example of the electricity storage elements, they may also be batteries formed by accommodating generator elements in metal battery cases.

(8) Although the foregoing embodiment shows an example used as a battery module 10 for ISG's, it can also be used as a battery module for other applications.

The invention claimed is:

1. An electricity storage module comprising:
   a stack formed by stacking a plurality of electricity storage elements having positive and negative lead terminals that protrude outward from end portions of the electricity storage elements and insulating holder members made of an insulating material for holding the electricity storage elements; and
   a connecting portion that is separate from the rest of the lead terminals and that connects together different polarized lead terminals of adjacent ones of the electricity storage elements is disposed in a position that is shifted with respect to other connecting portions at a same end portion of the stack as viewed from a stacking direction of the stack,
   wherein all of the connecting portions are held in windows formed in the insulating holder members.

2. The electricity storage module according to claim 1, wherein:
   a detection terminal that detects a condition of an electricity storage element of the electricity storage elements is connected to a lead terminal of the lead terminals of the electricity storage elements to be subjected to detection, and
   a detection terminal connecting portion formed by connecting the detection terminal to the lead terminal is provided in a location that is shifted in a direction of a protrusion of the lead terminals with respect to a connecting portion between the lead terminal to which that detection terminal is connected and a lead terminal of the lead terminals of an electricity storage element of the electricity storage elements adjacent to the lead terminal.

3. The electricity storage module according to claim 2, wherein:
   wires to be connected to control equipment for detecting a condition of the electricity storage elements and performing control are connected to detection terminals, and
   wire accommodation grooves for accommodating the wires are formed in the insulating holder members.

4. The electricity storage module according to claim 1, further comprising heat-transfer members held by the insulating holder members that conduct heat generated in the electricity storage elements.

5. The electricity storage module according to claim 4, wherein slide grooves for slidably mounting the heat-transfer members are formed in the insulating holder members.

6. The electricity storage module according to claim 4, further comprising:
   a casing for accommodating the stack,
   wherein heat-transfer member holder portions for holding the heat-transfer members at intervals are formed in the case.

7. The electricity storage module according to claim 1, wherein:
   connecting members to be electrically connected to external equipment are connected to the lead terminals of the electricity storage elements, and
   connecting member holder portions for holding the connecting members are formed in the insulating holder members.

8. The electricity storage module according to claim 1, wherein an insulating holder member of the insulating holder members is placed between adjacent electricity storage elements of the electricity storage elements.

* * * * *